United States Patent [19]

Brunnett et al.

[11] Patent Number: 5,008,822
[45] Date of Patent: Apr. 16, 1991

[54] COMBINED HIGH SPEED BACKPROJECTION AND FORWARD PROJECTION PROCESSOR FOR CT SYSTEMS

[75] Inventors: Carl J. Brunnett, Willoughby Hills; Allen B. Zachary, Cleveland; Holly C. Heiple, Cleveland Hts., all of Ohio

[73] Assignee: Picker International, Inc., Highland Hts., Ohio

[21] Appl. No.: 276,859

[22] Filed: Nov. 25, 1988

[51] Int. Cl.$^5$ ............................................. G06F 15/42
[52] U.S. Cl. .......................... 364/413.21; 364/413.19
[58] Field of Search ...................... 364/413.21, 413.20, 364/413.19

[56] References Cited

U.S. PATENT DOCUMENTS

| | | | |
|---|---|---|---|
| 4,217,641 | 8/1980 | Naparstek | 364/414 |
| 4,616,318 | 10/1986 | Crawford | 364/414 |
| 4,626,991 | 12/1986 | Crawford et al. | 364/413.22 |
| 4,777,598 | 10/1988 | Keller et al. | 364/413.22 |

OTHER PUBLICATIONS

"Reprojection Using a Parallel Backprojector" by Crawford, submitted for publication to Medical Physics.

"Reprojection Using a Parallel Backprojector" by Crawford, Med. Phys. 13(4), Jul./Aug. 1986, pp. 480–483.

"Errors in Reprojection Methods in Computerized Tomography" by Trussell, et al., IEEE Trans. on Med. Img., vol. MI-6, No. 3, Sep. 1987, pp. 220–227.

"An Improved Algorithm for Reprojecting Rays Through Pixel Images" by Joseph, IEEE Trans. on Med. Imag., vol. MI-1, No. 3, Nov. 1982, pp. 192–196.

"Principles of Computerized Tomographic Imaging" by Kak, et al., 1988, pp. 286–296.

Primary Examiner—Michael R. Fleming
Assistant Examiner—Gail Hayes
Attorney, Agent, or Firm—Fay, Sharpe, Beall, Fagan, Minnich & McKee

[57] ABSTRACT

A CT scanner (10) generates views of data such as equal angular increment detector fan views (FIG. 2A) which are convolved or filtered by an array processor (24). A combined backprojector and forward projector (28) backprojects the data from the array processor into an output memory (30) and forward projects lines of image representation data from an input memory (26) to the output memory. Each view representation may again be an equal angular increment detector fan format view (FIG. 2A), a parallel ray format view (FIG. 2B), an equal linear increment source fan format view (FIG. 2D), a source fan format view (FIG. 2C), an equal angular incremental detector fan format (FIG. 2E), an equal linear increment detector fan format (FIG. 2F), or an equal angular increment source fan format (FIG. 2G). In a backprojector mode, the projector is addressed by line and row addresses of a pixel of the output memory. A look-up table (76) and a multiplier (82) generate a weighting function W. A multiplier (78) and an adding means (80) along with the look-up table convert the memory addresses into an appropriate address for a line of view data stored in a projector memory (60). An element of view data retrieved in response to the received address is multiplied (84) by the weighting function. In a forward projector mode, a parallel ray forward projection configuration (92) is provided. A view format transform assembly (90) transforms other format view designations and addresses into the corresponding parallel ray format view designations and addresses.

18 Claims, 6 Drawing Sheets

COMBINED HIGH SPEED BACKPROJECTION AND FORWARD PROJECTION PROCESSOR FOR CT SYSTEMS

BACKGROUND OF THE INVENTION

The present invention is directed to the art of diagnostic imaging. It finds particular application in conjunction with CT scanners and will be described with particular reference thereto. However, it is to be appreciated that the invention may also find application in conjunction with magnetic resonance, positron emission, and other types of diagnostic imaging.

Heretofore, CT scanners have defined an examination region or scan circle in which the patient or other subject to be imaged was disposed. A beam of radiation was transmitted across the scan circle from an x-ray source to oppositely disposed radiation detectors. The segment of the beam impinging on a sampled detector defines a ray extending between the source and the sampled detector. The source or beam of radiation was rotated around the scan circle such that data from a multiplicity of rays crisscrossing the scan circle were collected.

The sampled data was convolved and backprojected into an image memory which was commonly described as a two dimensional array of memory elements. Each memory element stored a CT number indicative of the transmission or attenuation of the rays attributable to a corresponding incremental element within the scan circle. The data from each ray which crossed a given incremental element of the scan circle contributed to the corresponding CT number, i.e. the CT number for each memory element of the resultant image was the sum of contributions from the multiplicity of rays which passed through the corresponding incremental element of the scan circle.

Most commonly, the x-ray data was transformed into the image representation utilizing filtered backprojection. A family of rays was assembled into a view. Each view was filtered or convolved with a filter function and backprojected into the image memory. Various view geometries have been utilized in this process. As one example, each view was composed of the data corresponding to rays passing parallel to each other through the scan circle, such as from a traverse and rotate type scanner. In a rotating fan beam type scanner in which both the source and detectors rotate, each view could be made up of concurrent samplings of the detectors which span the x-ray beam when the x-ray source was in a given position, i.e. a source fan view. The detector commonly had either an equal linear spacing or an equal angular spacing. Alternately with a stationary detector rotating source geometry, a detector fan view could be formed from the rays received by a single detector as the x-ray source passed in back of the scan circle from that detector.

In forward projection, the image data was processed to synthesize each of the multiplicity of views that went through convolution and backprojection to make the image representation.

Various backprojection and forward projection algorithms have been developed. CT scanner customers normally demand a substantially instantaneous display of the resultant CT image. To obtain the image representation rapidly, the backprojection was normally performed with dedicated backprojection hardware. The many millions of computations required rendered general purpose computers inappropriately slow for backprojection. Various forward projection software routines have been written for general purpose minicomputers. However, the task of breaking the image representation apart into its component parts again requires many millions of computations. The execution time for such programs, commonly on the order of many minutes to hours, render forward projection too slow for many every day clinical applications.

In accordance with the present invention, a high speed backprojection/forward projection method and apparatus are provided.

SUMMARY OF THE INVENTION

In accordance with the present invention, a medical diagnostic data imaging system are provided. A CT scanner includes a source of radiation for irradiating a scan circle from a plurality of directions and a plurality of detectors for detecting the radiation which has traversed the scan circle. An array processor filters or convolves sampled data from the detectors. A combined forward/back projecting means backprojects filtered views of data from the array processor into an image memory. The forward/back projecting means further forward projects data from the image memory into a plurality of view memories in which each view or selected views are assembled.

In accordance with a more limited aspect of the present invention, data from views of one format, such as detector fan format views, are forward projected into views of another format, such as parallel ray views. Further processing, such as filtering or correcting, is done with algorithms specifically designed for the second format views.

In accordance with another aspect of the present invention, the image memory is loaded with an image representation from an imaging modality other than CT scanners. The image representations are forward projected, operated on with filter or correction functions originally developed for CT scanners, and reconstructed into another image representation.

In accordance with another aspect of the present invention, a combined backprojector and forward projector is provided for CT scanner type data. A memory means stores at least one of a line of view data and a line of image data. A memory address generating means generates addresses of data elements of the line of data stored in the memory means from inputs received on first and second inputs. A weighting function generating means generates a weighting function from the first and second inputs. A multiplying means multiplies a data element retrieved from the memory means by the weighting element. In a backprojecting mode, the memory means is loaded with lines of view data and the first and second inputs receive image memory addresses. In a forward projecting mode, the memory means is loaded with lines of image data and the first and second inputs receive view designations and addresses.

In accordance with another aspect of the present invention, a forward projector is provided for projecting image data into any one of a plurality of CT scanner view formats. First format view designations and addresses are received. A memory means stores a line of image data. A memory address generating means generates addresses for the memory means from the received first format view designations and addresses. A weighting function generating means generates weighting functions from the received first format view designations and addresses. A combining means combines the data retrieved from the memory means with the generated weighting functions. A view format transforming means transforms other format view designations and addresses into equivalents of the first format view designations and addresses. The view format transforming means is operatively connected with the address and weighting function generating means.

One advantage of the present invention is its speed. Not only is backprojection accomplished at a rapid speed, but forward projection is accomplished in less than ten seconds.

Another advantage of the present invention is that it enables medical personnel to implement image enhancement techniques previously only available for other view formats or for images reconstructed from other imaging modalities.

Another advantage of the present invention is that it is component-efficient. It enables filtered backprojection and forward projection techniques to be accomplished with less circuitry and hardware than prior art backprojectors.

Still further advantages of the present invention will become apparent to those of ordinary skill in the art upon reading and understanding the following detailed description.

BRIEF DESCRIPTION OF THE DRAWINGS

The invention may take form in various steps and arrangements of steps or in various components and arrangements of components. The drawings are only for purposes of illustrating a preferred embodiment and are not to be construed as limiting the invention.

DETAILED DESCRIPTION OF THE PREFERRED EMBODIMENT

Figure 1:
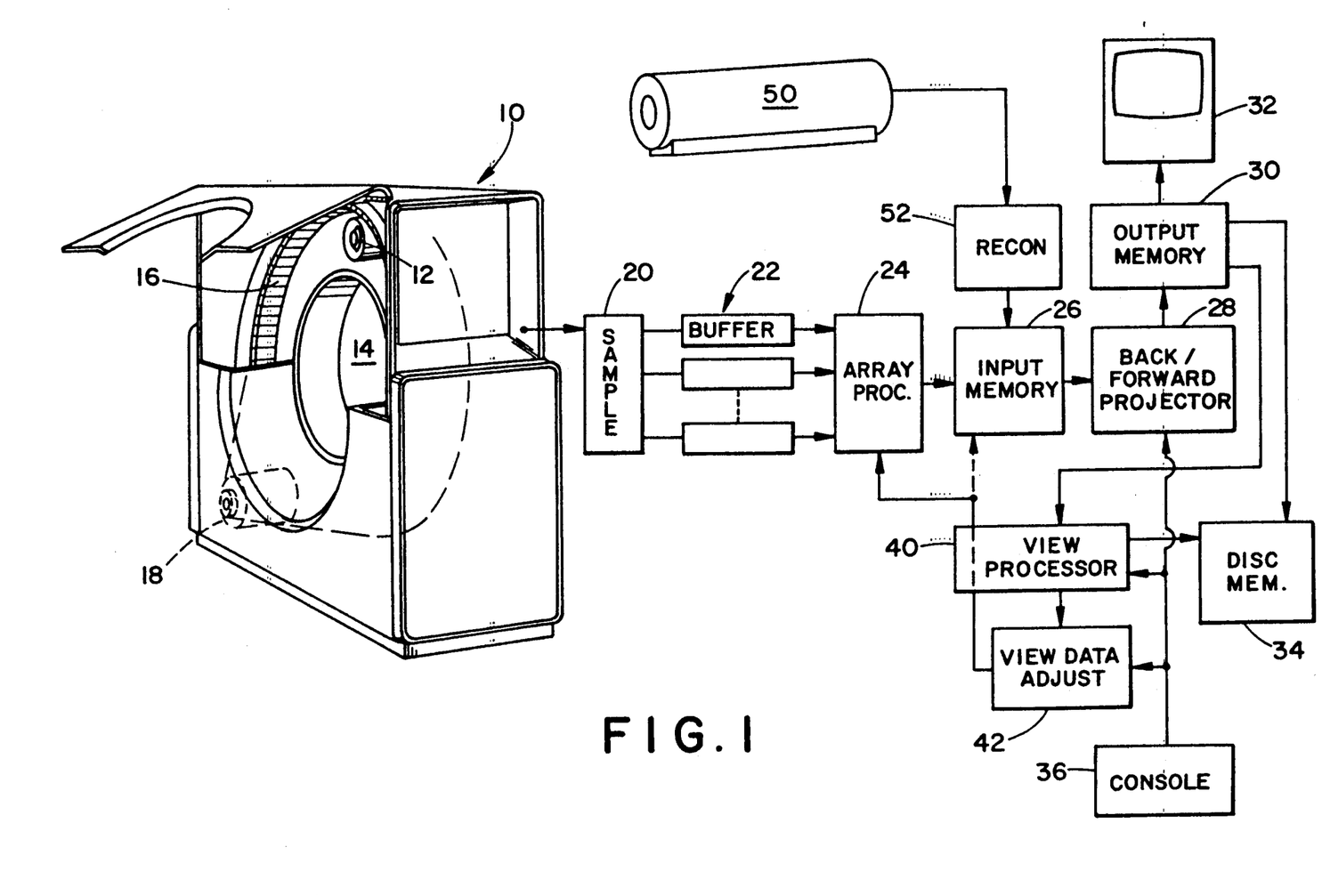
FIG. 1 is a diagrammatic illustration of a diagnostic imaging system in conjunction with the present invention.

With reference to FIG. 1, a CT scanner 10 includes an x-ray source or tube 12 for irradiating a scan circle 14 with a beam of radiation. An array of detectors 16 are disposed across the scan circle opposite from the x-ray source. In the preferred embodiment, the x-ray detectors include a stationary detector array completely circumscribing the scan circle. An x-ray beam rotating means 18, such as a motor and drive belt arrangement, rotates the beam of radiation around the scan circle. In the preferred embodiment, the x-ray beam rotating means includes a drive motor which rotates a gantry on which the x-ray tube is mounted continuously around the scan circle.

A sampling means 20 repeatedly samples the output of at least the detectors which are irradiated by the x-ray beam and receives an indication of the angular position of the x-ray source during the sampling. An array of buffer memories 22 store the data sampled by the sampling means.

Figure 2A:
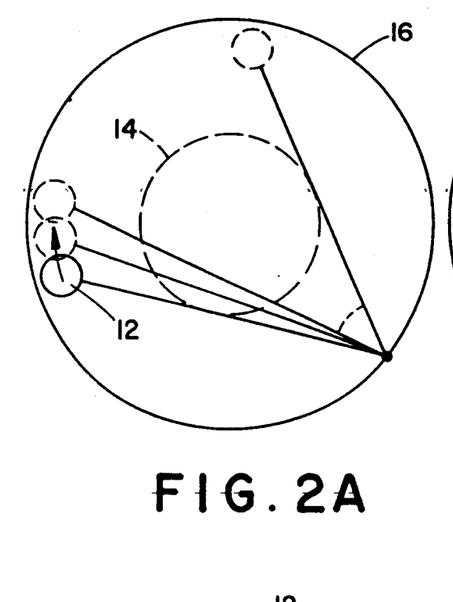
FIGS. 2A, 2B, 2C, 2D, 2E, 2F, and 2G are illustrative of detector fan with equal angular increments, parallel ray, source fan with equal angular increments, source fan with equal linear increments, detector fan with equal angular increments, detector fan with equal linear increments and source fan with equal angular increments, view formats, respectively.

With reference to FIG. 2A, the buffers in a preferred architecture each store the data from one of the irradiated detectors until the buffer holds a plurality of view data elements each corresponding to one of the rays of the detector fan view. The detector fan data is interpolated to correspond to one of the formats of FIGS. 2B–2G, preferably, the equal angular increment of FIG. 2E or the equal linear increment of FIG. 2F. Views of other formats, such as those illustrated in FIGS. 2A–2G as are known in the art, may also be directly collected or interpolated from the collected data.

An array processor 24 processes each view of data as is conventional in the art and loads them into an input memory 26. More specifically, the array processor performs mathematical manipulations which convolve each view with a filter or convolution function. Numerous filter and convolution functions appropriate to each view format and for various imaging protocols are known in the art.

A combined backprojecting and forward projecting means 28 backprojects each received view into pixels or memory elements (x,y) of an output memory 30. During the backprojection, the view data are converted into a weighted value for each memory element of the image memory and summed into the data previously stored in the same memory element. A display means 32, such as a video monitor, displays the reconstructed image representation in the output memory. Alternately, the image representation may be stored on a tape or disk storage means 34, subject to other processing, or the like. The backprojecting/forward projecting means 28 under the control of an operator console 36 selectively forward projects image data loaded into the input memory 26 into corresponding pixels of lines of the output memory means 30. The console configures the forward projecting means such that the resultant view representations stored in the output memory means correspond to source fan format views, detector fan format views, equal angular or linear increment format views, parallel ray format views, or the like.

A view processing means 40 operates on the reconstructed views with conventional view processing techniques. For example, the view processing means may cause single, individual views to be displayed on the video monitor 32 or stored in the tape or disk memory 34. Alternately, the view processing means may convey the view representations to a view data adjusting means 42 which operates on the data of each view with conventional filter or correction functions, such as a bone hardness correction algorithm or the like. The filtered or corrected views are further operated upon by the view processing means to be altered and stored, as may be appropriate for the configuration of the array processor 24. Alternately, the view processing means may perform an appropriate filter or convolution operation for the selected view format. The view processor transforms the altered views to the view format for which the array processor and backprojector are projected. The views are returned to the input of the array processor convolved and backprojected into a revised or adjusted image representation. If the altered views are already convolved, the set view representations are loaded into the input memory 26 and backprojected.

Optionally, an additional imaging modality 50, such as a magnetic resonance imaging apparatus, a PET scanner, digital x-ray apparatus, or the like may also generate image data. An image reconstruction means 52 implements an appropriate algorithm for the imaging modality of imager 50 to reconstruct image representations. The image representations are loaded directly into the input memory 26. Alternately, the second modality image representations may be stored on tape or disk and later loaded into the input memory 26. This enables the image representations from other imaging modalities to be forward projected into the corresponding views that would have been produced by a CT scanner and to be corrected or processed with CT scanner filters, correction algorithms, or the like.

Figure 3:
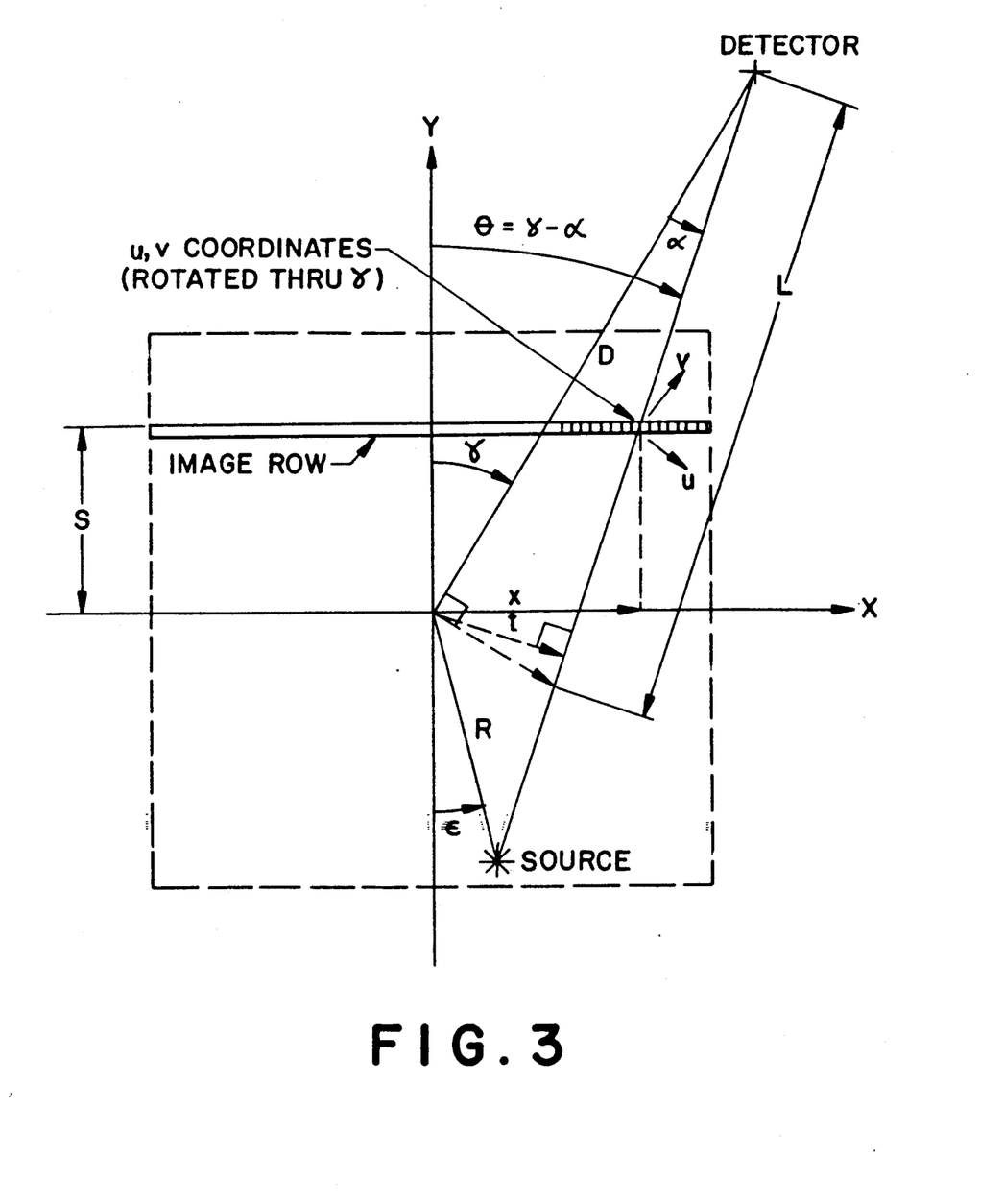
FIG. 3 is illustrative of the relative geometries of the image memory and scanner geometry incorporating the geometric terms and relationships referenced in Equations (1) through (16)
Figure 4:
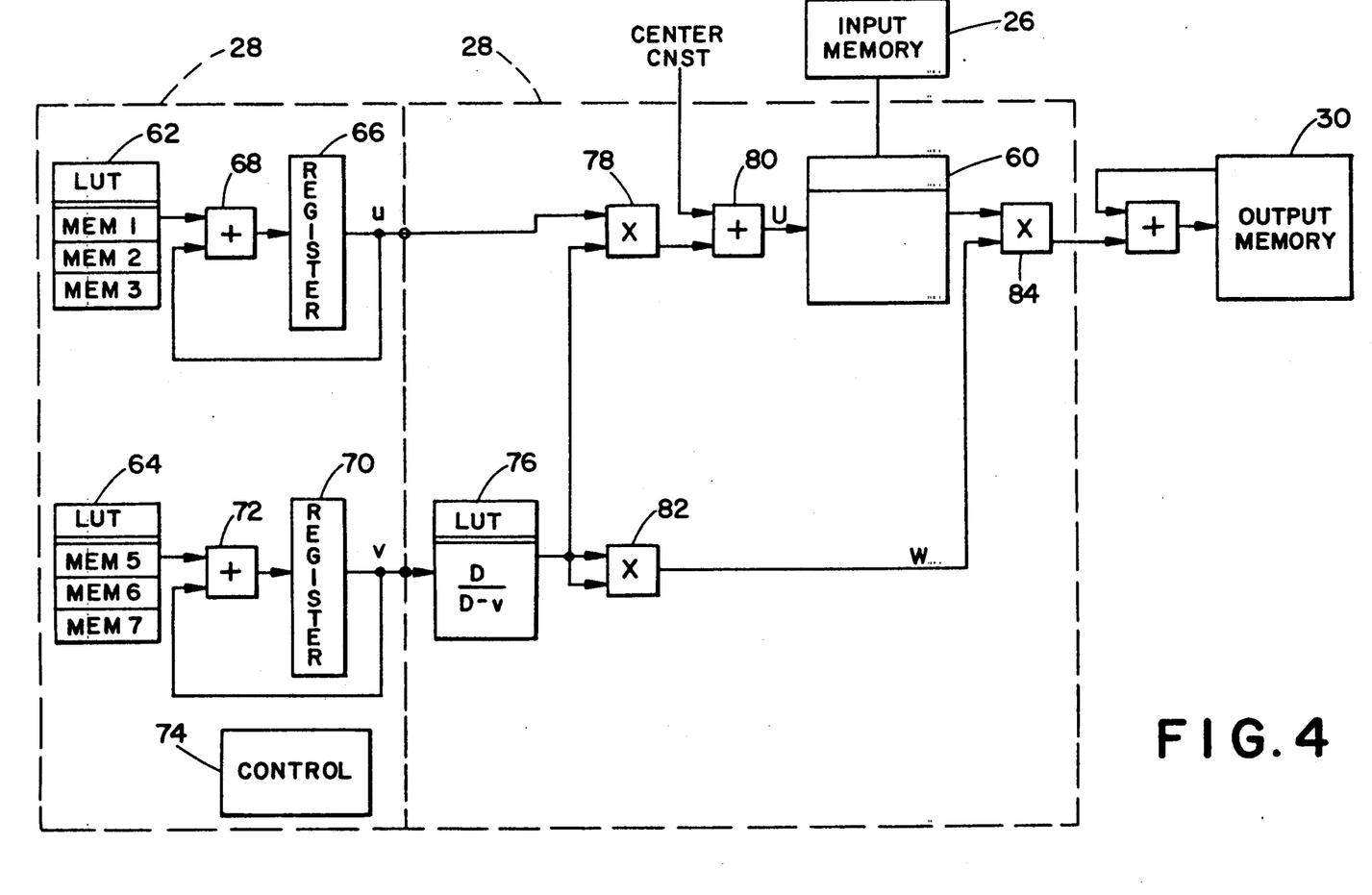
FIG. 4 is a diagrammatic illustration of details of a backprojector configuration of the combined back/forward projector of FIG. 1; and, FIG. 5 is a diagrammatic illustration of the forward projector configuration of the combined back/forward projector of FIG. 1.

With reference to FIGS. 3 and 4, the output memory 30 when configured to receive an image representation is conceptualized as a rectangular array of memory elements which are denoted by the rectangular coordinates (x,y). The (x,y) coordinate system is rotated through an angle $\gamma$ to form a second coordinate system (u,v). The (u,v) coordinate system has the same origin, i.e. center of the image circle, as the (x,y) coordinate system. The v axis is coincident with a line extending from the vertex of the fan data to the origin. The backprojector receives each view $\Theta$ from the array processor and temporarily stores it in a projector memory means 60. Each view includes a one dimensional array of view data elements U. The relationship between the view data address U and the image coordinates u and v is given by the relationship:

$$U = \left(\frac{D}{D-v}\right)^u, \tag{1}$$

where the dimension D is defined in FIG. 3. Each view data element is weighted before being added to the corresponding elements of the image representation in the output memory. A weighting function W is defined by:

$$W = \left(\frac{D}{D-v}\right)^2, \tag{2}$$

where the geometric relationships are again defined by FIG. 3.

In the backprojecting mode, memories 62 and 64 contain the parameters of Table 1.

TABLE 1

| Backprojection |
| --- |
| MEM 1 = $u_o$ |
| MEM 2 = $\Delta u_x$ |
| MEM 3 = $\Delta u_y$ |
| MEM 5 = $v_o$ |
| MEM 6 = $\Delta v_x$ |
| MEM 7 = $\Delta v_y$ |

Initial values of u and v, uo and vo respectively correspond to the initial image coordinates pixel address xo and yo. Typically, the image row address x is incremented from one end to the other. Then, the column and address y is incremented and the end to end x incrementation is repeated. This process is continued until the last image column and row address is reached. Each time x is incremented, the u and v values are generated by incrementing $\Delta u_x$ and $\Delta v_x$, respectively. Thus, $$u(new) = u(old) + \Delta u_x \tag{3}$$

$$v(new) = v(old) + \Delta v_x \tag{4}$$

Likewise, when y is incremented the u and v values are:

$$u(new) = u(old) + \Delta u_y \tag{5}$$

$$v(new) = v(old) + \Delta v_{2y} \tag{6}$$

A register 66 stores the u value and an adder 68 selectively increments the u value by one of $\Delta u_x$ and $\Delta u_y$. Analogously, a register 70 stores the v value and an adder 72 selectively increments the v value by one of $\Delta u_x$ and $\Delta v_y$. A control means 74 controls the loading of memories 62 and 64 in accordance with Table 1.

Columns and rows may, of course, be reversed. A look-up table 76 is preprogrammed to be addressed by the value v and retrieve the corresponding value (D/(D-v)). The value of D is, of course, a constant for a given CT scanner.

A projector memory address generating means includes a multiplying means 78 which multiplies each value of u by the D/(D-v) value. An adding means 80 adds a centering constant as may be appropriate to bring the center of the scan circle and the center of the image memory into coincidence. The projector memory 60 is addressed with this value to retrieve the corresponding view data element.

A multiplying means 82 multiplies the D/(D-v) value by itself, i.e. squares the value, to generate the weighting factor W. A multiplying means 84 multiplies the retrieved view data element by this weighting function. This process is repeated until the appropriate contribution from each element of the view has been made to each memory element the image representation of the output memory. The projector memory 60 is then reloaded with the next line of data, i.e. the next convolved view from the array processor and memories 62, 64 are loaded with the next values of $U_o$, $\Delta u_x$, $\Delta u_g$, $\Delta v_x$, $\Delta v_g$ and the process is repeated.

Figure 5:
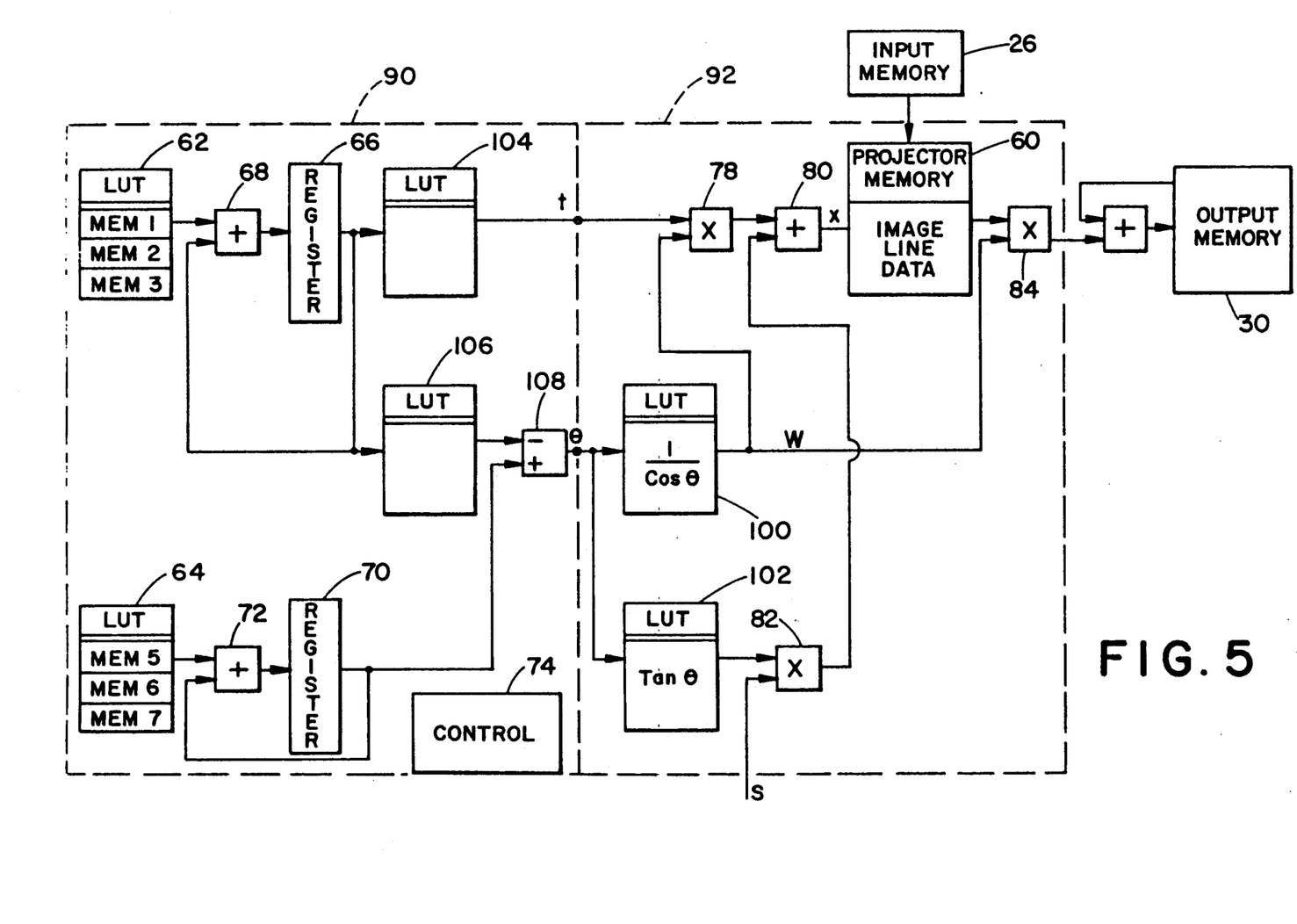

With reference to FIG. 5, in a forward projecting mode, the projector memory 60 is loaded with one line of the image data from the input memory 26, which may be expanded or interpolated as necessary. The output memory 30 accumulates the synthesized view data. The forward projector consists of two basic sections—a first section 90 and a view synthesizing means 92. The first section 90 determines the view format. It transforms the view designations and addresses of other formats into standard $\theta$, t format used by the view synthesizing means 92. Specifically, the view format is determined by the values loaded into memories 62 and 64 and look-up tables 94 and 96, and the interconnect configuration of the first section 90 as controlled by the control means 74. Tables 2, 3, 4, and 5 tabulate the values loaded into memories 62 and 64.

TABLE 2

| Forward Projecting (Parallel) |
| --- |
| MEM 1 = $t_o$ |
| MEM 2 = $\Delta t$ |
| MEM 3 = na |

TABLE 2-continued

Forward Projecting (Parallel)

MEM 5 = 0
MEM 6 = Δθ
MEM 7 = na

TABLE 3

Forward Projecting (fan equal angular increment)

MEM 1 = $\alpha_o$
MEM 2 = $\Delta\alpha$
MEM 3 = na
MEM 5 = $\gamma_o$
MEM 6 = $\Delta\gamma$
MEM 7 = na

TABLE 4

Forward Projecting (fan equal linear increment)

MEM 1 = $U_o$
MEM 2 = $\Delta U$
MEM 3 = na
MEM 5 = $\gamma_o$
MEM 6 = $\Delta\gamma$
MEM 7 = na

TABLE 5

Forward Proj (det. fans, equal source angl incremented)

MEM 1 = $\gamma_o + \epsilon_o$
MEM 2 = $\Delta\epsilon$
MEM 3 = $\Delta\gamma$
MEM 5 = $\gamma_o$
MEM 6 = $\Delta\gamma$
MEM 7 = na The view synthesizing means 92 accepts inputs from the first section 90 and generates the contribution to the views stored in the output memory 30.

Figure 2B:
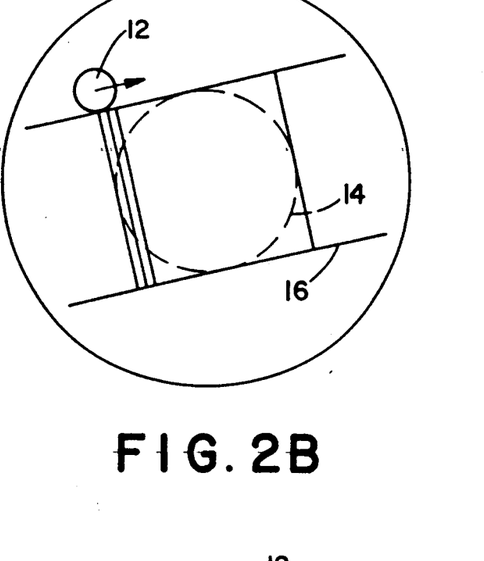
Figure 2C:
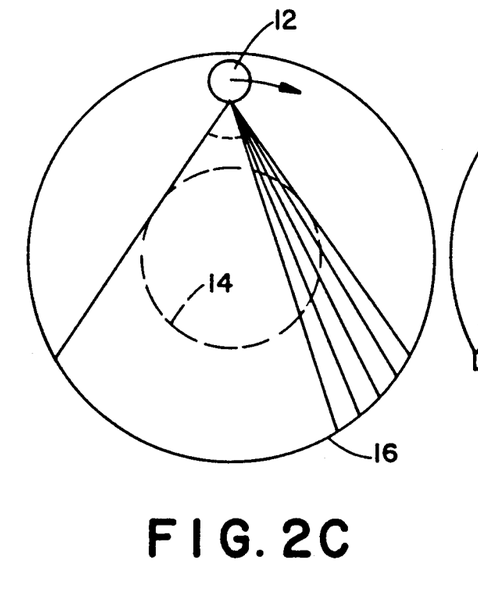

In the parallel ray format view of FIG. 2B, each view is denoted by its angular position Θ. Each element of data within the view is denoted by its position therealong t. The forward projector retrieves the corresponding data value from each data row as described by the relationship:

$$x = \frac{t}{\cos\theta} + S\tan\theta. \quad (7)$$

The weighting factor for each retrieved data value from the image memory line is weighted by a weighting value W:

$$W = \frac{1}{\cos\theta}. \quad (8)$$

Each line of image data is loaded into the projector input memory 60. The values of the data positions t along a selected view Θ are incremented until the appropriate data from the stored image data row is provided for each data element of the view Θ. The view Θ is then incremented by one and each of its addresses t cyclically addressed. This process is repeated until the weighted data values from the first image data line are forward projected into the appropriate data elements of each view. Then, a second line of image data is loaded into the projector memory means 60, the memories 62 and 64 are loaded with the next values, and the incrementing of the data positions t and views Θ is repeated.

To implement these forward projection relationships, the memory, multiplier, and adder components of FIG. 5 are reconfigured by the control means 74. A look-up table means includes a look-up table 100 that is loaded with the values of 1/cosΘ and a second look-up table 102 is loaded with the values of tanΘ. Although the cosine and tangent values may be calculated, the use of look-up tables improves processing speed. The projector memory addresses generating means which includes the multiplying means 78 which multiplies the t view element address by the retrieved 1/cosΘ value. The multiplying means 82 multiplies the tanΘ value by the position S of the data line in the image representation. In the illustrated embodiment in which rows are loaded, the position S is indicative of its row of data in projector memory. The adding means 80 adds the S tanΘ value to the product from the multiplier 78 to create the address x of a data line stored in the projector memory means 60.

Typically, in actual operation, first view data is synthesized for Θ over the range of ±45°. When this limit is exceeded, image column data is loaded into projector memory 60. The distance S is now measured from the y axis, and Θ is measured from the x axis. FIG. 3 is valid if the y axis is changed to the x axis and the x axis is changed to the y axis.

The operator can also select to forward project the data into equal angle detector fan format views as illustrated in FIG. 2A. Each equal angular increment detector fan format view is denoted by its angular position γ around the scan circle and the data along each view is denoted by the angular positions α of the rays of the view. The format means 90 generates the γ, α addresses and transforms them into equivalent parallel Θ,t addresses for the view synthesizing means 92. The parallel ray format view designation Θ and view addresses t are related to the equal angular increment detector fan format view designation and addresses γ and α by:

$$t = D \sin\alpha \quad (9)$$

$$\Theta = \gamma - \alpha \quad (10)$$

The memory data line address x and the weighting value W of Equations (7) and (8) in the equal angular increment detector fan format become:

$$x = \frac{t}{\cos\theta} + S\tan\theta = \frac{D\sin\alpha}{\cos(\gamma - \alpha)} + S\tan(\gamma - \alpha) \quad (11)$$

$$W = \frac{1}{\cos\theta} = \frac{1}{\cos(\gamma - \alpha)}. \quad (12)$$

The address α is converted to a value that can replace the t address by a look-up table 104. A look-up table 106 which looks up the corresponding value of D sinα. A subtraction means 108 subtracts the view address α from the view designation γ to generate the value equivalent to Θ of the view synthesizing means. The values of t and Θ then address the view synthesizing means 92 as described above.

Figure 2D:
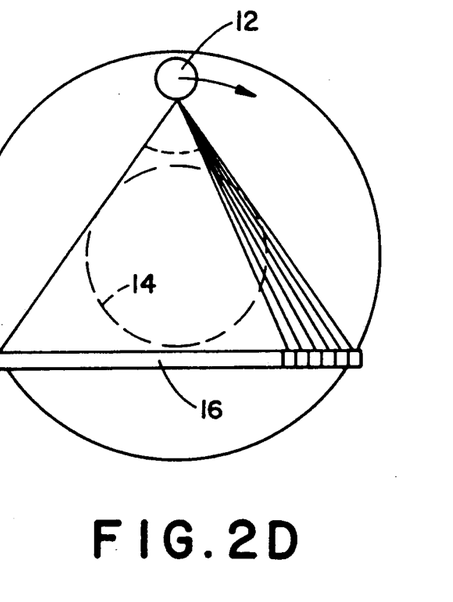
Figure 2E:
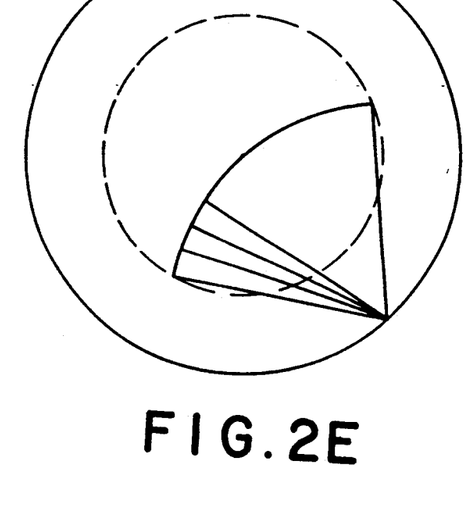
Figure 2F:
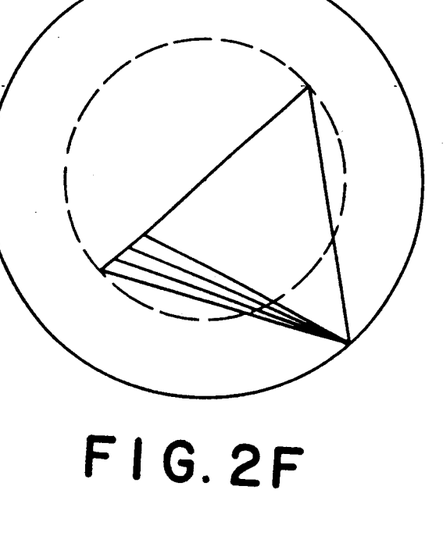

When collecting fan data with equal linear increments as illustrated in FIG. 2D, each view is denoted by its angular position γ around the scan circle and the linear increment U along each view. The position along each equal linear increment fan data format view is related to the address t of the parallel ray format view and the view angle position γ is related to the angular position Θ of parallel ray format views by the relationships:

$$t = \frac{UD}{(U^2 + D^2)^{\frac{1}{2}}} \quad (13)$$

$$\theta = \gamma - \tan^{-1}\left(\frac{U}{D}\right). \quad (14)$$

Inserting these equations into the relationship of Equations 7 and 8, the address x of the image data line in the backprojector memory 60 and the weighting factor W become:

$$x = \frac{U + S(\sin\gamma - (U/D)\cos\gamma)}{\cos\gamma + (U/D)\sin\gamma} \quad (15)$$

$$W = \frac{(1 + (U/D)^2)^{\frac{1}{2}}}{\cos\gamma + (U/D)\sin\gamma}. \quad (16)$$

The format transform means look-up table 104 converts each data position U along one of the views to the corresponding t address. Specifically, the look-up table 104 is preprogrammed in accordance with Equation (13). The look-up table 106 determines the $\tan^{-1}(U/D)$ value and the subtraction means 108 subtracts this quantity from the view angle $\gamma$ to generate the Θ equivalent value for the second forward projector input.

Figure 2G:
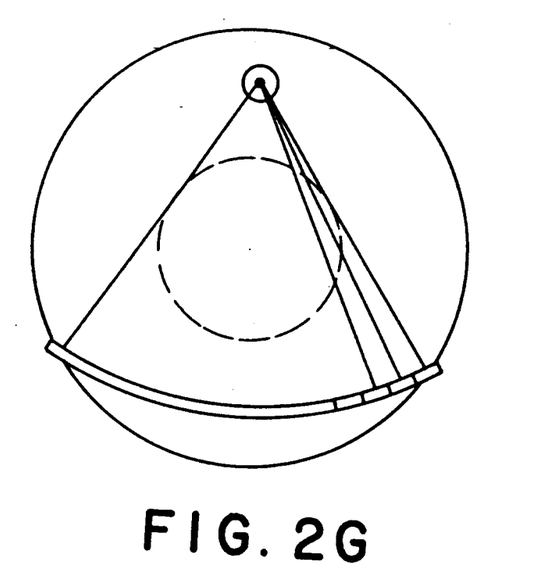

The forward projector can also be configured to project detector fan format views with equal angular source increments as illustrated in FIG. 2G. Each view is denoted by the angular source position $\epsilon$ and each view data element is designated by its angular increment $\gamma$. The equivalent values for the parallel ray format view designation Θ and data address t are related to $\gamma$ and $\epsilon$ by:

$$t = \frac{DR\sin(\gamma + \epsilon)}{(R^2 + D^2 + 2DR\cos(\gamma + \epsilon))^{\frac{1}{2}}} \quad (17)$$

$$\theta = \gamma - \tan^{-1}\frac{R\sin(\gamma + \epsilon)}{D + R\cos(\gamma + \epsilon)}. \quad (18)$$

Inserting these relationships into Equations (7) and (8), the data line address x and the weighting factor W become:

$$x = \frac{DR\sin(\gamma + \epsilon) + S(D\sin\gamma - R\sin\epsilon)}{D\cos\gamma + R\cos\epsilon} \quad (19)$$

$$W = \frac{(R^2 + D^2 + 2DR\cos(\gamma + \epsilon))^{\frac{1}{2}}}{D\cos\gamma + R\cos\epsilon}. \quad (20)$$

The memory 62, adder 68, and register 66 generate the angle $\gamma + \epsilon$. The look-up table 104 is addressed by the ($\gamma + \epsilon$) sum to retrieve a corresponding value precalculated in accordance with Equation (17) as the corresponding t address. The other look-up table 104 is preprogrammed in accordance with the inverse tangent portion of Equation (18). Each time the position along the data line is incremented, the look-up table 106 is addressed by the new ($\gamma + \epsilon$) term to retrieve the corresponding inverse tangent function which is subtracted from the value of $\gamma$ by the subtraction means 108 to generate a view designation equivalent to the parallel ray view designation or angle.

In the described preferred embodiment, the forward projector algorithm is based on parallel ray geometry. The format transforming means adjusts for other view formats, such as source fan views, detector fan views, equal angle views, equal linear increment views, and the like. The view synthesizing means 92 may function in any one of these or other view formats. To accommodate the other view formats, the format transforming means may reverse some of the algorithms, combine algorithms, or the like as is appropriate to transform the selected view formats into the format selected for use in the view synthesizing means 92.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A diagnostic imaging system comprising:
   a CT scanner for generating CT views of radiation intensity data, each CT view including view data elements which correspond to an intensity of radiation along a corresponding ray through a scan circle;
   an array processor means for processing a plurality of the CT views;
   a non-invasive examination means for generating diagnostic data indicative in interior regions of a subject;
   an image reconstruction means for reconstructing the diagnostic data into an image representation;
   a combined backprojector and forward projector means for backprojecting views into an image representation and for forward projecting data of the image representation into view representations;
   an input memory which is connected with an input of the combined backprojector and forward projector means for selectively loading the image representation data into the combined backprojector and forward projector means to be forward projected into the view representations, the input memory being operatively connected with the image reconstruction means.

2. A diagnostic imaging apparatus comprising:
   a CT scanner for generating views of radiation intensity data, each view including view data elements which correspond to an intensity of radiation along a corresponding ray through a scan circle;
   an array processor means for processing a plurality of views;
   a combined backprojection and forward projection means for backprojecting the processed views into an image representation and for forward projecting data of the image representation into view representations;
   an output memory means for receiving forward projected view representations from the combined backprojection and forward projection means;
   a view representation adjusting means for adjusting view representations in accordance with a preselected algorithm, the view representation adjusting means being operatively connected with the output memory means for receiving the forward projected view representations therefrom and being operatively connected with at least one of the array processor and the combined backprojection and forward projection means for supplying the adjusted view representations thereto to be backprojected into an adjusted image representation.

3. A diagnostic imaging apparatus comprising:
  a CT scanner for generating view data lines of radiation intensity data, each view data line including view data elements which correspond to an intensity of radiation along a corresponding ray through a scan circle;
  an array processor means for processing a plurality of data lines;
  a combined backprojector and forward projector means for backprojecting the processed view data lines into an image representation and for forward projecting image data lines of the image representation into view data lines, the combined backprojector and forward projector means including:
    a projector memory means for receiving lines of data, in a backprojecting mode the lines of data being view data lines and in a forward projecting mode the lines of data being image data lines;
    a weighting function multiplying means for multiplying each data value retrieved from the projector memory means by a weighting function.

4. The apparatus as set forth in claim 3 further including:
  a look-up table addressing means for generating each of a plurality of view angle designations Θ;
  a look-up table means which is connected with the addressing means to be addressed by each view angle designation Θ to retrieve values 1/cosΘ and tanΘ from the look-up table means, the look-up table means being operatively connected with the weighting function multiplying means for conveying the 1/cosΘ value thereto;
  a second multiplying means for multiplying a view data element address designation by the 1/cosΘ term;
  a third multiplying means for multiplying the tan term by a function of a position of an image data line stored in the projector memory means relative to the image representation; and,
  an adding means operatively connected with the second and third multiplying means for adding the outputs thereof and being operatively connected with the projector memory means for addressing the line of image data therein.

5. The apparatus as set forth in claim 4 wherein the view angle designation is an indication of an angle of a parallel ray format view and the view data element address is a designation of one of the parallel rays of the view and further including a view format transforming means for transforming view designations and addresses of other view formats into an equivalent of a parallel ray format view designation and data element addresses.

6. The apparatus as set forth in claim 5 wherein the view format transforming means includes at least one of;
  a means for transforming equal linear increment fan format view designations and addresses into parallel ray format view designations and addresses;
  a means for transforming equal angular increment detector fan format view designations and addresses into parallel ray format view designations and addresses; and,
  a means for transforming equal angular increment source fan format view designations and addresses into parallel ray format view designations and addresses.

7. The apparatus as set forth in claim 3 further including:
  in a backprojecting configuration, first and second inputs for receiving image memory row and column addresses;
  a memory address generating means for generating addresses of view elements of each view data line stored in the projector memory means from the image memory row and column addresses;
  a weighting function generating means for generating the weighting function from the image memory row and column addresses, the weighting function generating means being operatively connected with the weighting function multiplying means.

8. A diagnostic imaging apparatus comprising:
  a non-invasive examination means for generating views of examination data, each view including view data elements which correspond to a ray through an examination region;
  a combined backprojector and forward projector means for backprojecting the views into an image representation and for forward projecting data from the image representation into views, the combined backprojector and forward projector means including:
  a projector memory means for receiving lines of data, in a backprojecting mode the lines of data being views and in a forward projecting mode the lines of data being lines of the image representation;
    a weighting function multiplying means for multiplying each data value retrieved from the projector memory by a weighting function;
    a first and second inputs for receiving data line designations and data addresses for a data element within each data line for one of an image data line and a view data line;
    a memory address generating means operatively connected with the inputs for generating an address of a data element in the other of the image data and view data line stored in the projector memory means; and,
    a weighting function generating means operatively connected with the first and second inputs for generating a weighting function from the projected line designations and addresses, the weighting function generating means being operatively connected with the weighting function multiplying means.

9. A combined backprojector and forward projector for CT scanner type data, the combined projector comprising:
  a memory means for storing at least one of (i) a line of view data and (ii) a line of image data, each line of data having a plurality of data elements;
  input means for selectively receiving one of forward projection and backprojection address generating information;
  an address generating means for generating addresses of data elements of the line of data stored in the memory means in accordance with received address generating information, the address generating means being operatively connected with the memory means and with the input means; and,
  a weighting function generating means operatively connected with input means for generating weighting functions therefrom;

a first multiplying means operatively connected with the memory means to receive each addressed data element therefrom and operatively connected with the weighting function generating means for receiving weighting functions therefrom for multiplying the data elements by the weighting functions.

10. The projector as set forth in claim 9 wherein in a backprojecting mode:
   image memory row and column addresses are received on the input means;
   the weighting function generating means includes a look-up table means connected with the input means for outputting a value D/(D-v) in response to being addressed by a value v, where v is a received one of the row and addresses and D is a diameter from a center of a scan circle to a corresponding radiation detector, the look-up table means being connected with a second multiplying means for squaring the look-up table output value, the second multiplying means being operatively connected with the first multiplying means to supply the squared look-up table output value thereto; and,
   the address generating means includes a third multiplying means operatively connected with the input means and operatively connected with the look-up table means for multiplying the address generating information received on the input means by the look-up table value and an adding means for adding a centering constant to the product of the third multiplying means, the adding means being operatively connected with the memory means for addressing the memory with the output thereof.

11. The projector as set forth in claim 9 further wherein in a backprojecting configuration:
   the input means receives image memory row and column designations;
   the memory address generating means generates a view data element address from the image memory row and column addresses;
   the weighting function generating means generates the weight function from the image memory row and column addresses.

12. The projector as set forth in claim 9 wherein in a forward projection mode:
   a parallel ray format view designation and a view data element address which is a designation of one of the parallel rays of the designated parallel ray format view are received on the input means and further including a view format transforming means for transforming view designations and addresses of other view formats into an equivalent of a parallel ray format view designation and data element addresses.

13. The apparatus as set forth in claim 12 wherein the view format transforming means includes at least one of:
   a means for transforming equal linear increment fan format view designations and addresses into parallel ray format view designations and addresses;
   a means for transforming equal angular increment detector fan format view designations and addresses into parallel ray format view designations and addresses; and,
   a means for transforming equal angular increment source fan format view designations and addresses into parallel ray format view designations and addresses.

14. The projector as set forth in claim 9 wherein in a forward projection mode:
   a view designation and a view address are received at the input means and a line of data from an image representation is stored in the memory means, the view designation being a view angle indicative of an angle of a parallel ray format view through the scan circle;
   the weighting function generating means and the memory address generating means include a look-up table means which is addressed by the view angle $\Theta$ to retrieve values $1/\cos\Theta$ and $\tan\Theta$, the $1/\cos\Theta$ value being conveyed to the first multiplying means;
   a second multiplying means for multiplying the view address by the $1/\cos\Theta$ value;
   a third multiplying means for multiplying the tan value by an indication of a position of the image data line stored in the memory means relative to a remainder of the image representation; and,
   an adding means for adding the product of the second and third multiplying means, the adding means being connected with the memory means for addressing the memory with the output thereof.

15. A backprojector for CT scanner type data, the backprojector comprising:
   first and second inputs which receive image memory row and column addresses u and v;
   a memory means for storing a line of view data element;
   a weighting function generating means operatively connected with at least one of the first and second inputs for generating a weighting function therefrom, the weighting function generating means including a look-up table means and a look-up table accessing means connected with the input means for addressing the look-up table with the address v and retrieving a value D/(D-v) in response thereto, where D is a diameter from a center of a scan circle to a corresponding detector;
   a first multiplying means for squaring the retrieved D/(D-v) value, the first multiplying means being operatively connected with the look-up table means;
   a second multiplying means operatively connected with the memory means for multiplying a data element retrieved therefrom by the squared value from the first multiplying means; and,
   a memory address generating means for generating addresses of view data elements of the line of view data elements stored in the memory means, the address generating means including a third multiplying means operatively connected with the input means and operatively connected with the look-up table accessing means for multiplying the address u received by the input means by the D/(D-v) value and an adding means for adding a centering constant to the third multiplying means product, the adding means being operatively connected with the memory means.

16. A forward projector for CT scanner type data, the forward projector comprising:
   first and second inputs for receiving a parallel ray format view angle designation $\Theta$ and a view data element address;

a memory means for storing line of an image representation;

a look-up table means which is addressed by the view angle Θ to retrieve values 1/cosΘ and tanΘ;

a first multiplying means for multiplying the view address by the 1/cosΘ value;

a second multiplying means for multiplying the tanΘ value by an indication of a position of the image data line stored in the memory means relative to the image representation;

an adding means for adding the product of the first and second multiplying means, the adding means being connected with the memory means for addressing the memory means to retrieve an image data element; and, a third multiplying means for multiplying the image data element retrieved from the memory means by the 1/cosΘ value.

17. A forward projector for projecting image data into any one of a plurality of CT scanner data view formats, the projector comprising:

a means for receiving first format view designations and addresses;

a memory means for storing a line of image data;

a memory address generating means for generating addresses for the memory means from the received first format view designations and addresses;

a weighting function generating means for generating weighting functions from the received first format view designations and addresses;

a combining means for combining data retrieved from the memory means with the generated weighting functions; and, a view format transforming means for transforming other format view designations and addresses into equivalents of the first format designations and addresses, the view format transforming means being operatively connected with the address and weighting function generating means.

18. A diagnostic imaging apparatus comprising:

a CT scanner for generating fan views of radiation intensity data, each fan including data elements which correspond to a line integral of intensity of radiation along a family of rays arranged in a fan pattern with a common apex, each data element of each view corresponding to an intensity of radiation along a corresponding ray from the fan apex;

an array processor means for processing a plurality of the fan views;

a combined backprojection and forward projection means for backprojecting fan views and parallel ray views into image representations and for forward projecting the image representations into fan and parallel ray views, each parallel ray view corresponding to an array of parallel rays through the scan circle, each parallel ray view including a plurality of view data elements which correspond to a line integral of radiation intensity along a corresponding one of the parallel rays.

* * * * *